(12) United States Patent
Krutzler (10) Patent No.: US 11,036,822 B2
(45) Date of Patent: Jun. 15, 2021

(54) MANIPULATION AND UPLOAD OF VIDEO CONTENT USING PLACEHOLDER IMAGES

(71) Applicant: VERIZON MEDIA INC., New York, NY (US)

(72) Inventor: Steven Krutzler, Los Angeles, CA (US)

(73) Assignee: VERIZON MEDIA INC., New York, NY (US)

( * ) Notice: Subject to any disclaimer, the term of this patent is extended or adjusted under 35 U.S.C. 154(b) by 0 days.

(21) Appl. No.: 16/156,206

(22) Filed: Oct. 10, 2018

(65) Prior Publication Data

US 2019/0042587 A1 Feb. 7, 2019

Related U.S. Application Data

(63) Continuation of application No. 11/536,387, filed on Sep. 28, 2006, now Pat. No. 10,108,730.

(51) Int. Cl.
*G06F 16/958* (2019.01)

(52) U.S. Cl.
CPC .................... *G06F 16/958* (2019.01)

(58) Field of Classification Search
CPC .................................................. G06F 16/958
See application file for complete search history.

(56) References Cited

U.S. PATENT DOCUMENTS

| 5,404,316 A | 4/1995 | Klingler et al. |
| 5,729,673 A | 3/1998 | Cooper et al. |
| 5,999,173 A | 12/1999 | Ubilos |
| 7,036,083 B1 | 4/2006 | Zenith |
| 7,073,127 B2 | 7/2006 | Zhao et al. |
| 7,325,199 B1 | 1/2008 | Reid |
| 7,552,388 B2 | 6/2009 | Yoshimine |
| 8,555,200 B2 | 10/2013 | Hicks et al. |
| 8,584,002 B2 | 11/2013 | Cave et al. |
| 2002/0120674 A1 | 8/2002 | Son et al. |
| 2005/0050453 A1 | 3/2005 | Bamabel |
| 2005/0268227 A1 | 12/2005 | Calson et al. |
| 2006/0031770 A1 | 2/2006 | McMenamin |
| 2006/0206807 A1 | 9/2006 | Rosner et al. |
| 2006/0259588 A1 | 11/2006 | Lerman et al. |

(Continued)

OTHER PUBLICATIONS

David Sawyer McFarland, "Dreamweaver8: The Missing Manual," Dec. 2005, O'Reilly Media, Inc., ISBN: 9780596100568, Chapters 12-13. (Year: 2005).*

(Continued)

*Primary Examiner* — Dino Kujundzic
(74) *Attorney, Agent, or Firm* — James J. DeCarlo; Greenberg Traurig, LLP (57) ABSTRACT

Methods and systems for posting video content on a website are disclosed herein. An input indicative of a selection of video content is received from a user. A placeholder image is inserted in an input field to act as a placeholder for the video content being selected. Image manipulation commands are received from the user. The image manipulation commands are applied to the image placeholder in order to display the image placeholder in a user desired configuration. The placeholder image can be replaced with the video content. Displaying the video content in the user desired configuration.

16 Claims, 9 Drawing Sheets

(56) References Cited

U.S. PATENT DOCUMENTS

| 2007/0162846 | A1* | 7/2007 | Cave | G06F 16/958 |
| | | | | 715/210 |
| 2007/0204209 | A1 | 8/2007 | Truelove et al. | |
| 2008/0098301 | A1 | 4/2008 | Black et al. | |
| 2013/0125039 | A1 | 5/2013 | Murata | |

OTHER PUBLICATIONS

Tom Negrino and Dori Smith, "Macromedia Dreamweaver 8 for Windows and Macintosh: Visual QuickStart Guide," Dec. 2005, Peachpit Press, ISBN: 9780321350275, Chapter 8. (Year: 2005).*
Tutvid, "Flash Movies into Your Website: Dreamweaver Tutorial" video, posted on YouTube on Oct. 20, 2007, available at https://youtu.be/opn9Q6Yksb4 (duration: 7 minutes and 6 seconds). (Year: 2007).*
Steve Johnson and Andy Anderson, "Adobe Dreamweaver CS3 On Demand," 2008, Que Publishing, pp. 287-289 and 294-299. (2008).
Janine Warner, "Dreamweaver CS4 for Dummies," Oct. 6, 2008, For Dummies, pp. 301-310. (2008).
Tips for New Bloggers—Add Video Clip to Blog, published on Mar. 17, 2007 at http://tips-for-new-bloggers.blogspot.com, pp. 1-9 (2007).
Tips for New Bloggers—Customize Video Upload in Blogger, published on Aug. 25, 2007 at http://tips-for-new-bloggers.blogspot.com, pp. 1-5. (2007).
Kate Shoup, "Office 2007: Top 100 Simplified Tips & Tricks," Dec. 17, 2007, Visual, pp. 158-159. (2007).
Compact Oxford English Dictionary, 2005, Oxford University Press, Third Edition, p. 288.

* cited by examiner

MANIPULATION AND UPLOAD OF VIDEO CONTENT USING PLACEHOLDER IMAGES

CROSS REFERENCES TO RELATED APPLICATIONS

This application is a continuation of and claims priority from co-pending U.S. patent application Ser. No. 14/536,387, filed on Sep. 28, 2006, entitled "METHOD AND SYSTEM FOR POSTING VIDEO," the entirety of which is incorporated herein by reference.

BACKGROUND

1. Field

This disclosure relates to methods and systems for posting video on a computer display.

2. General Background

The expansion of the Internet and the World Wide Web ("web") has given computer users the enhanced ability to post various different forms of media through their computers. Such media can be in the form of audio, videos, any other form of media that a user wishes to post. Media is now overwhelmingly being distributed through computer networks. Furthermore, users frequently access media via a personal computer, handheld devices, etc. However, users who wish to post videos on web blogs, message boards, or other sharing mechanisms, have to use complicated methods to format and post video clips.

SUMMARY

In one aspect, there is a method of posting video content on a website. An input indicative of a selection of video content is received from a user. A placeholder image is inserted in an input field to act as a placeholder for the video content being selected. Image manipulation commands are received from the user. The image manipulation commands are applied to the image placeholder in order to display the image placeholder in a user desired configuration. The placeholder image can be replaced with the video content. Displaying the video content in the user desired configuration.

In another aspect, there is a system of posting video on a website. The system can comprise a user interface module, a replacing module, and a rendering module. The user interface module can be configured to receive from a user an input indicative of a selection of video content. The user interface module can further be configured to insert in an input field a placeholder image to act as a placeholder for the video content being selected. The user interface module can be configured to receive image manipulation commands which are applied to the image placeholder to display the image placeholder in a user desired configuration by the user. The replacing module can be configured to replace the placeholder image with the video content. The rendering module can be configured to display the video content in the user desired configuration.

In another aspect, there is an interface for posting videos on a website that includes a video thumbnail list, an input filed pane, and a published posting. The video thumbnail list can contain one or more video thumbnails that represent video content. The input field pane can be used to enter editing information for a posting in the website. The editing information entered in the input field pane can include a video thumbnail that is dragged from the video thumbnail list to the input field pane. The video thumbnail list can be displayed as a placeholder image that can be manipulated by a user to have a desired configuration. The published posting display can display video content corresponding to the placeholder image using the desired configuration.

DRAWINGS

The features and objects of alternate embodiments of the present disclosure will become more apparent with reference to the following description taken in conjunction with the accompanying drawings of various examples wherein like reference numerals denote like elements and in which.

DETAILED DESCRIPTION

A system and method of posting video on the World Wide Web is described herein. The system herein permits a user to easily add video clips to a website posting (e.g., a blog, a discussion board entry, etc.). Upon a user selecting the video content to be added to the website posting, a placeholder image can be inserted in lieu of the video content. The placeholder image is presented to the user so as to allow the user to manipulate the image as if the user would be manipulating the video content. User manipulation can include locating and resizing the video image. Thus, unlike conventional systems that require user knowledge of computer code and programming languages, users can intuitively and easily control and manipulate the placeholder image via known user interfaces using a pointing device. Once the user has manipulated the image to a desired or preferred configuration, the user can select to publish the posting. The placeholder image can then be replaced with the corresponding video content, which is displayed in the same manner as the manipulated placeholder image.

Figure 1:
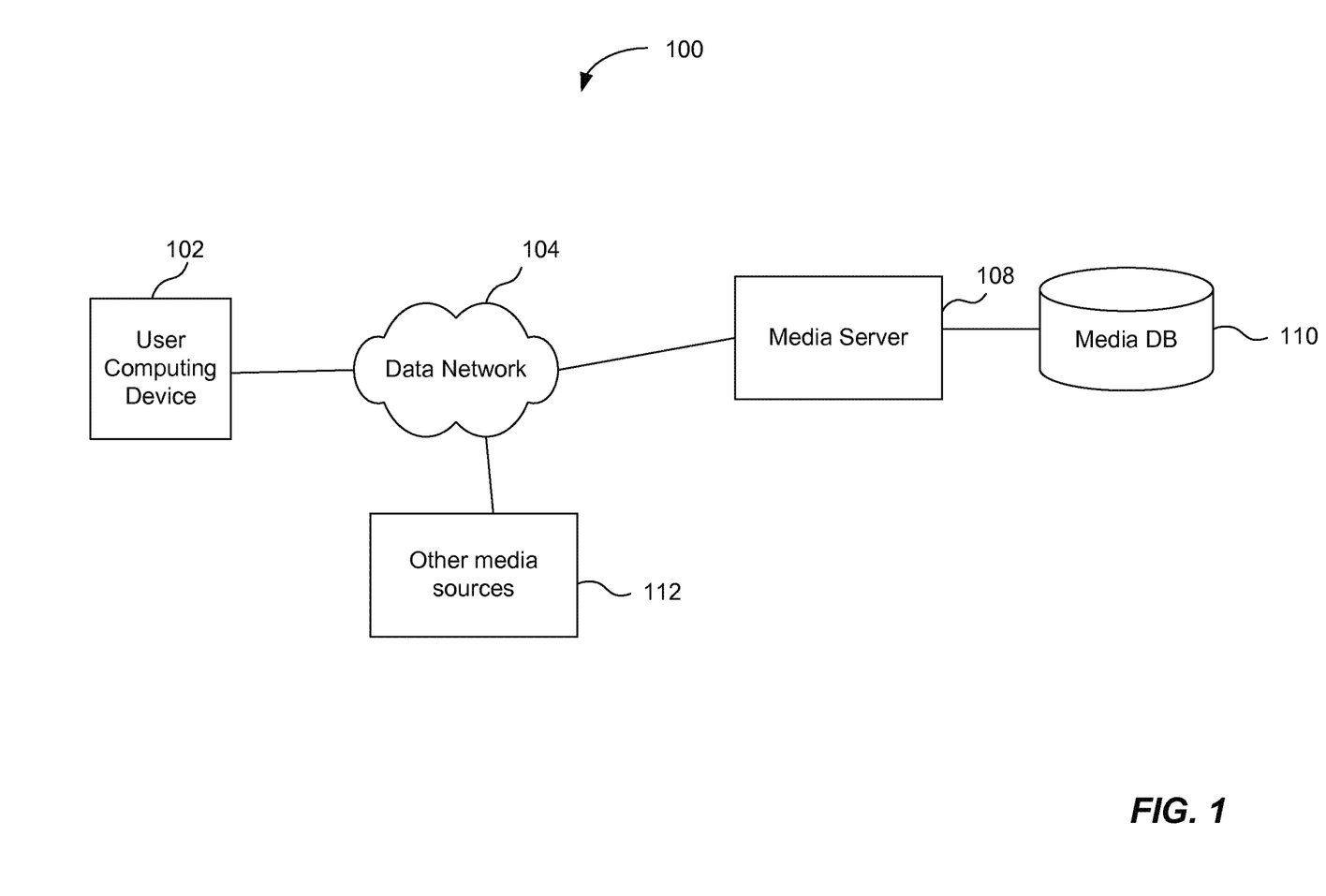
FIG. 1 depicts a component diagram of a system for posting video on a website according to one embodiment.

FIG. 1 depicts a component diagram of a system for posting video on a website according to one embodiment. The system 100 can include a user computing device 102 that is utilized by a user to interact with the World Wide Web. As such, the user computing device 102 can be configured with a client application such as a web browser that can receive markup language (e.g., HTML, XML, etc.) from a web server, as well as any other information pertinent to a website. In addition, the client application can further be configured to request images, video, audio and text from a web server. The user computing device 102 can be a laptop, desktop, wireless device, handheld device, PDA, cell phone or any other computing device that can host a client application such as a web browser. Furthermore, the user computing device 102 can be configured with one or more software modules for displaying and rendering images, video, and media, manipulating images, etc. A display (not shown) can be coupled to the computing device 102 in order to receive video signals for presentation of a video. Examples of a display 104 can include a computer display, a flat panel display, a liquid crystal display, a plasma display, a video projector and screen, a CRT display or any other visual display that can be configured to display the video received from the computing device 102.

Furthermore, the system 100 can also include a media server 108 that communicates with the user computing device 102 over a data network 104. The data network 104 can be the Internet or any other computer network that allows communication between the computing device 102 and the media server 108. The media server 108 can further be configured with a web server that submits source code such as HTML or other markup language data to the user computing device 102. In one example, the media server 108 submits the source code at the request of the user or the browser in the user computing device 102. The web server residing in the media server 108 can be configured to transmit images, text, or other media to the user computing device 102 in order to be displayed at the web browser on the user computing device 102. In one example, the web server can be configured to host web blogs or other web sites through which users can post text, audio, video and any other media. In addition, the media server 108 can be in communication with the media database 110 that stores images, video, audio and any other digital media. The media server 108 can be configured to retrieve the media from the database 110 or store the media on the media database 110 according to commands received from the user computing device 102.

In one embodiment, the user can upload an image through the data network 104 to the media server 108. The media server 108 can then store the image at the media database 110. In another embodiment, the user may upload a video file through the data network 104 to the media server 108 to be stored at the media database 110. In yet another embodiment, media stored at the media database 110 can be pre-existing media or media that has been uploaded by other users through the media server 108 and stored at the media database 110. The user can retrieve media stored at the media database 110 to post video or other media on a blog belonging to the user. In one example, the user computing device 102 transmits a request to select a video file that is stored at the media database 110 or another media that is stored at the media database 110. Once the user requests the video file or media that is stored at the media database 110, the media server 108 can retrieve the video or image from the database 110 and include the retrieved media or video into a posting being processed at the media server 108. Therefore, the user at the user computing device 102 can include one or more media items in a blog posting or any other posting that the user would like to have as part of a website.

In addition, a user may also utilize media that is stored in other media sources 112. For example, a user may provide a network address or any other reference that can permit the media server to locate media stored in network storing devices, servers, etc. For example, the user at the user computing device 102 can provide the HTML code that includes a URL (universal resource locator) that references an address in the network where the image is located. Various websites and data repositories stored in the data network can be made accessible to users. Therefore, providing the network address to the media server 108 can serve the media server 108 to incorporate video or images, or any other media, that the user wants to include in a user's posting.

The media server 108 can be configured with one or more software modules that permit the display, rendering, interaction, and manipulation of images, video and any other media necessary to compose the user's posting. In one example, the media server 108 can include logic to utilize an image placeholder for a video posting. In a further example, the media server 108 can include logic for rendering video images or audio. In another example, the media server 108 can include logic to retrieve data from a network location or from a database locally accessible to the media server 108.

Figure 2:
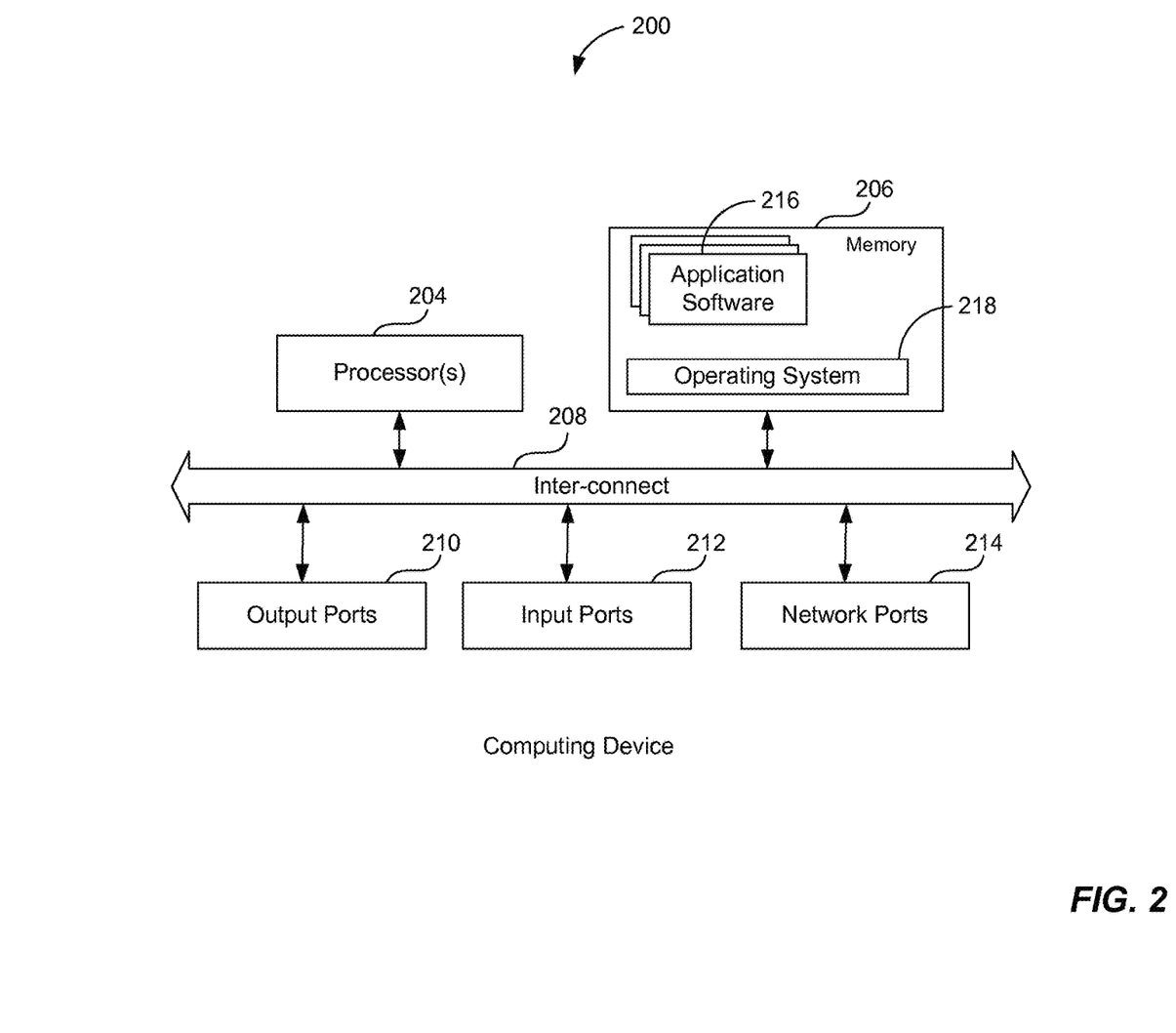
FIG. 2 depicts a component diagram of a computing device according to one embodiment.

FIG. 2 depicts a component diagram of one example of a computing device 200 according to one embodiment. The computing device 200 can be utilized to implement one or more computing devices, computer processes, or software modules described herein. In one example, the computing device 200 can be utilized to process calculations, execute instructions, receive and transmit digital signals, as required by the computing device 200. In one example, the user computing device can be utilized to process calculations, execute instructions, receive and transmit digital signals, as required by user interface logic, video rendering logic, decoding logic, replacement logic, or search engines as discussed below.

The computing device 200 can be any general or special purpose computer now known or to become known capable of performing the steps and/or performing the functions described herein, either in software, hardware, firmware, or a combination thereof.

The computing device 200 includes an inter-connect 208 (e.g., bus and system core logic), which interconnects a microprocessor(s) 204 and memory 206. The inter-connect 208 interconnects the microprocessor(s) 204 and the memory 206 together. Furthermore, the interconnect 208 interconnects the microprocessor 204 and the memory 206 to peripheral devices such input ports 212 and output ports 210. Input ports 212 and output ports 210 can communicate with I/O devices such as mice, keyboards, modems, network interfaces, printers, scanners, video cameras and other devices. In addition, the output port 210 can further communicate with the display 104.

Furthermore, the interconnect 208 may include one or more buses connected to one another through various bridges, controllers and/or adapters. In one embodiment, input ports 212 and output ports 210 can include a USB (Universal Serial Bus) adapter for controlling USB peripherals, and/or an IEEE-1394 bus adapter for controlling IEEE-1394 peripherals. The inter-connect 208 can also include a network connection 214.

The memory 206 may include ROM (Read Only Memory), and volatile RAM (Random Access Memory) and non-volatile memory, such as hard drive, flash memory, etc. Volatile RAM is typically implemented as dynamic RAM (DRAM), which requires power continually in order to refresh or maintain the data in the memory. Non-volatile memory is typically a magnetic hard drive, flash memory, a magnetic optical drive, or an optical drive (e.g., a DVD RAM), or other type of memory system which maintains data even after power is removed from the system. The non-volatile memory may also be a random access memory.

The memory 206 can be a local device coupled directly to the rest of the components in the data processing system. A non-volatile memory that is remote from the system, such as a network storage device coupled to the data processing system through a network interface such as a modem or Ethernet interface, can also be used. The instructions to control the arrangement of a file structure may be stored in memory 206 or obtained through input ports 212 and output ports 210.

In general, routines executed to implement one or more embodiments may be implemented as part of an operating system 218 or a specific application, component, program, object, module or sequence of instructions referred to as application software 216. The application software 216 typically can comprises one or more instruction sets that can be executed by the microprocessor 204 to perform operations necessary to execute elements involving the various aspects of the methods and systems as described herein. For example, the application software 216 can include video decoding, rendering and manipulation logic.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks, (DVDs), etc.), among others. The instructions may be embodied in digital and analog communication links for electrical, optical, acoustical or other forms of propagated signals, such as carrier waves, infrared signals, digital signals, etc.

Figure 3:
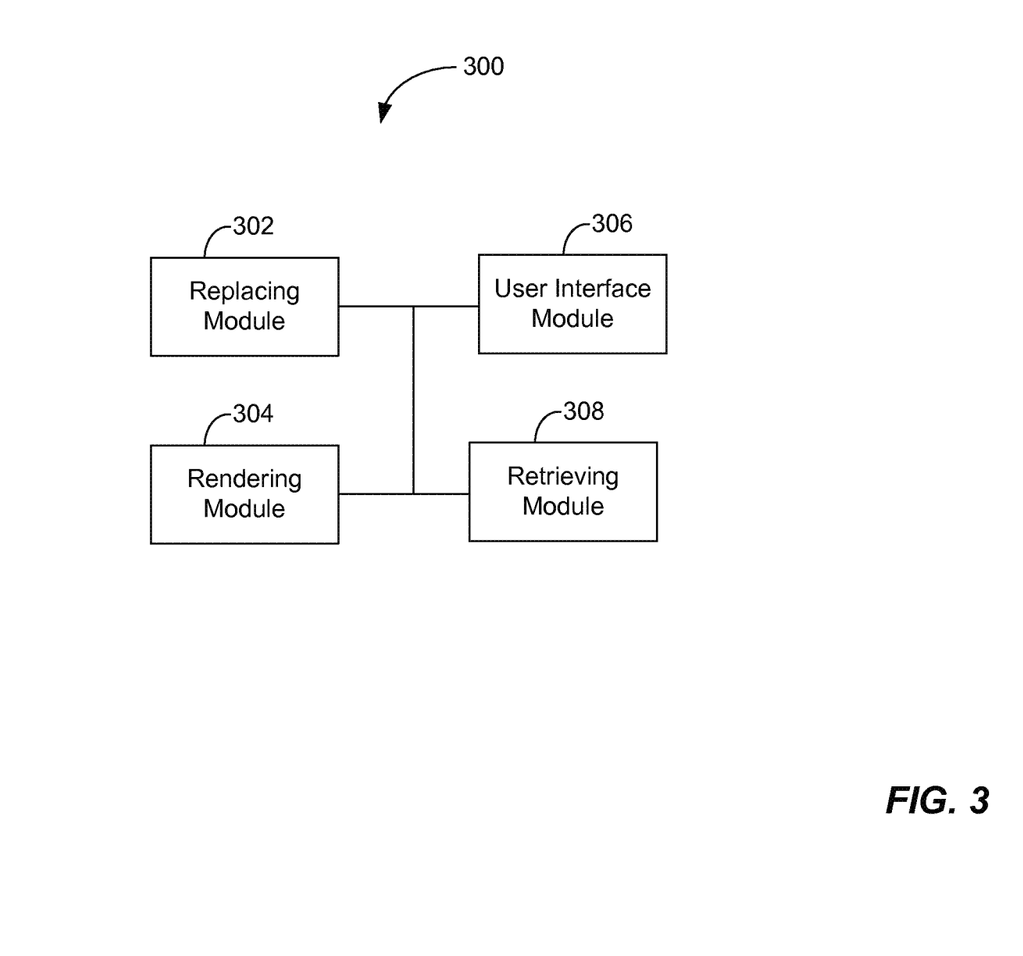
FIG. 3 depicts exemplary software component modules for posting and providing video according to one embodiment.

FIG. 3A depicts exemplary software component modules 300 for posting and providing video. The component modules can be provided as part of software configured in the media server 108. The exemplary software component modules can include a replacing module 302, a rendering module 304, a user interface module 306 and a retrieving module 308.

In one embodiment, the replacing module 302 can include software logic to receive an input from a user to select a video content to be place in a posting. The selection by the user can be utilized to place an image on a posting field as a placeholder for a video. Therefore, the replacing module 302 can be configured to receive the selection input from the user in order to place a placeholder image on a posting field. In one example, the replacing module 302 is configured to receive a drag and drop of the placeholder image file as the selection input. In another example, the replacing module 302 is configured to receive the selection input as a markup language tag that references a network location of a video file. Once a placeholder image has been manipulated and placed in the correct size and location by the user, the replacing module 302 can further be configured with logic to replace the placeholder image with the video content selected. In one embodiment, the replacing module 302 can be configured to replace the markup language code that references the placeholder image with the markup language code the references the video content.

In a further embodiment, the rendering module 304 can be configured to receive, decode, and display video signals to the display 104. In addition, the rendering module 304 can also be configured with logic to operate video playback. For example, the rendering module 304 can be configured with a play operation, a stop operation, a fast forward operation, a pause operation and/or a rewind operation. Based on user input or another module's input, the rendering module 304 can execute any one of these operations when displaying video. In addition, the rendering module 304 can also be configured with logic to display a title, elapsed time or any other data associated with the displayed video. In addition, the rendering module 304 can be configured to buffer video input received from the one or more video sources. The buffered video can correspond to live streams, or any other type of video that is streamed to the computing device 102. As part of the buffering operation, the video can be stored in a hard drive, cache, random access memory, or any other memory module coupled with the computing device 102.

In yet another embodiment, the rendering module 304 can be configured with logic to display the displayed video as a full screen display, as a video thumbnail, or as any other size required by a user. Furthermore, the rendering module 304 can also include audio control commands and operations that a user can utilize to control both the visual display and the accompanying audio portion, if any.

The user interface module 306 can be configured with graphical user interface items that are displayed at the display 104 in order to provide the user with tools for interacting with the display, rendering, searching, and/or manipulating of one or more images, videos or other media.

The user interface module 306 can further include logic to interpret cursor control or user input commands from a user (via for example a mouse, keyboard, stylus, trackball, touchscreen, remote control, or other pointing device) such as selecting or clicking on a video thumbnail or a displayed video, double-clicking on a video thumbnail or a displayed video, permitting a user to hover over or roll-over a video thumbnail, etc. User input mechanisms provided by the user input interface module 306 can include drop down menus, pop up menus, buttons, radio buttons, checkboxes, hyperlinked items, etc. In addition, the user interface module 306 can also be configured to provide user interface menus for setting display and audio preferences, etc.

The user interface module 306 can be configured to permit a user to select the position of the presented video in the display area. In one example, the user interface module 306 can include logic to allow a user to drag video thumbnails to any position on a posting input field as selected by the user. In another example, the user interface module 306 can include logic to allow a user to set the layout and placement of the displayed video. In yet another example, the interface module 306 can include logic to allow a user to manipulate a placeholder image in size. In yet another example, the interface module 306 can include logic to allow a user to manipulate a placeholder image in location.

The user interface module 306 can include user input mechanisms to select the playing, stopping, seeking, rewinding, pausing or fast forwarding video. In addition, the user interface module 306 can also include commands for maximizing a displayed video, minimizing a displayed video, displaying a video clip as a video thumbnail, etc.

The user interface module 306 can be further configured with logic to operate video playback and display. For example, utilizing a mouse, or other pointing device, a user can click on a video display region, such as a video thumbnail, in order to turn on or turn off the audio associated with the displayed video. In another example, a user can utilize a mouse pointer to hover over the area of a video display region in order to change the degree of translucency of the displayed video to opaque (i.e. zero percent translucent). In yet another example, a user can utilize a mouse pointer to double click on a video display region in order to change the size of the video display region. For example, if the video display region is a video thumbnail that occupies a small amount of space of the display 104, rolling over or double clicking on the video thumbnail can increase the size of the video display region to occupy a larger portion of the screen of the display 104.

Furthermore, the user interface module 306 can also permit a user to rewind and view a portion of the video. The video can be buffered and saved in a memory module in order to permit later viewing of the video, pausing and resuming the viewing of the video, etc.

The retrieving module 308 can also be included as a separate component of the media server 108 in order to permit a user to submit queries and search for images or videos that the user may be interested in. For example, the retrieving module 308 can be configured to receive user queries and retrieve videos from the media database 110 or request a server to retrieve videos from a database or other sources. In one embodiment, the retrieving module 308 may contain logic to access one or more video sources accessible over a network, for example, the Internet, such as other media sources 112.

Figure 4A:
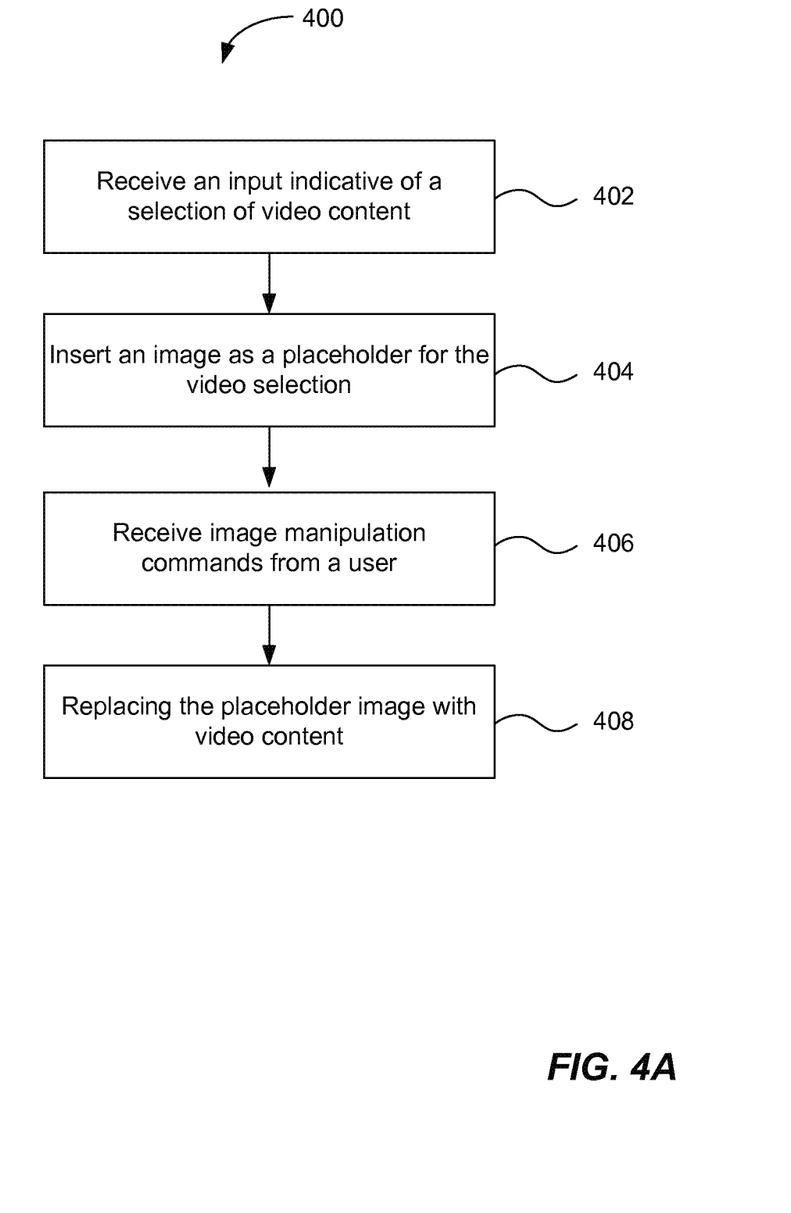
FIG. 4A depicts a flow diagram of a process for posting video on a website according to one embodiment.

Of course, various configurations of the software modules can be implemented. In one embodiment, the rendering module 304 resides as a separate application from the retrieving module 308 and the user interface module 306. Likewise, the user interface module 306 can reside as a separate application. In addition, the retrieving module 308 can also reside as a separate application. In yet another embodiment, the rendering module 304, the retrieving module 308 and the user interface module 306 can interact together as computer processes as a single application residing at the computing device and being executed on the processor 204 of the computing device. Additionally, the retrieving module 308 may reside in whole or in part on a server operated by a service provider.

displayed once the posting is published. Inserting an image as a placeholder for the video content provides the benefit of permitting the user to manipulate the size, location and other attributes of display of the video content without having to actually manipulate the video content, but rather manipulate a placeholder image that represents the video content. Process 400 continues at process block 406.

At process block 406, image manipulation commands are received from a user. As previously mentioned, image manipulation commands can include resizing of the video content display, changing the location of the video content display within the posting field, changing picture characteristics such as saturation, hue, brightness, etc. Process 400 continues at process block 408.

At process block 408, the image placeholder is replaced with the video content. The image placeholder can be replaced with video content by replacing the hypertext markup language corresponding to the placeholder image for hypertext markup language corresponding to the video content. For example, the image placeholder can have a reference tag as shown in Table A below.

TABLE A

<img id="836180" src="http://sid.video.search.yahoo.com/get?letl5XMM" name="placeholder" title="Star Trek Remastered 40th Anniversary Trailer" alt="Star Trek Remastered 40th Anniversary Trailer" height="240" width="320">

The video content can have a related markup language reference tag as shown in Table B below. This markup language reference tag can replace the markup language reference tag corresponding to the placeholder image.

TABLE B

<embed src='http://us.i1.yimg.com/cosmos.bcst.yahoo.com/player/media/swf/FLVVideoSolo.swf' flashvars='id=836180&emailUrl=http%3A%2F%2Fvideo.yahoo.com%2Futil%2Fmail%3Fei%3DUTF-8%26vid%3Dec66e9b618a972cbe03791f40d842def.836180%26vback%3DStudio%26vdone%3Dhttp%253A%252F%252Fvideo.yahoo.com%252Fvideo%252Fstudio%253Fei%253DUTF-8%2526b%253D21&imUrl=http%253A%252F%252Fvideo.yahoo.com%252Fvideo%252Fplay%253F%2526ei%253DUTF-8%2526vid%253Dec66e9b618a972cbe03791f40d842def.836180&imTitle=Star%2BTrek%2BRemastered%2B40th%2BAnniversary%2BTrailer&searchUrl=http://video.yahoo.com/video/search?p=&profileUrl=http://video.yahoo.com/video/profile?yid=&creatorValue=c2tldmg%3D' type='application/x-shockwave-flash' width='425' height='350'></embed>

FIG. 4A depicts a flow diagram of a process for posting video on a website according to one embodiment. At process block 402 an imprint indicative of a selection of video content is received from a user. The input can be, for example, a drag and drop action executed at a user interface on a web browser. In another example, a user input can be the pasting or typing of hypertext markup language or any other markup language that references a network location or network address of video content. In yet another embodiment, the input can be a double click of a video thumbnail that represents the video content being selected. Process 400 continues the process block 404.

At process block 404, an image is inserted as a placeholder for the video selection. The image can be inserted in an input field wherein text pictures and other media can be inserted. Therefore, the image inserted as in the input field is in fact a placeholder for the video content that will be In another embodiment, other methods of replacing the image placeholder with video content can be utilized.

Figure 4B:
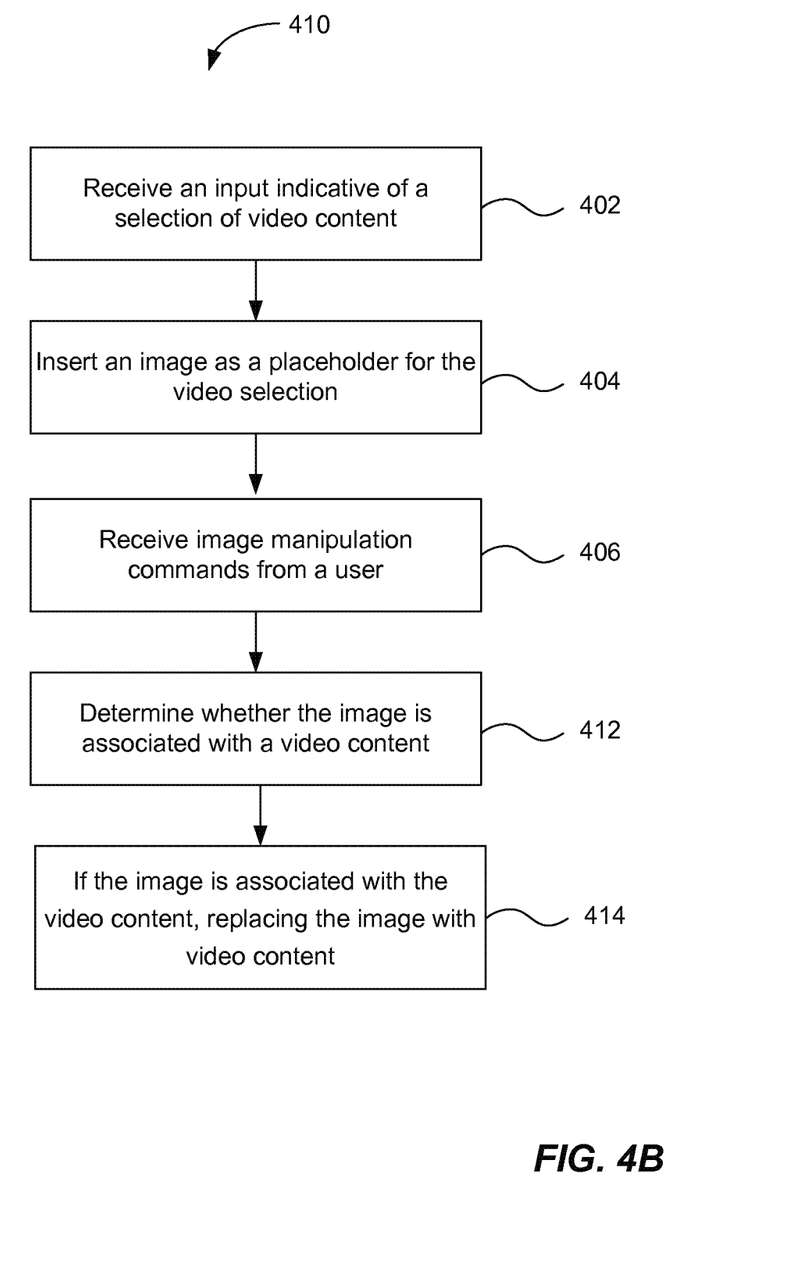
FIG. 4B depicts a flow diagram of a process for posting video on a website according to one embodiment.

FIG. 4B depicts a flow diagram of a process for posting video on a website according to one embodiment. Process 410 generally includes the process steps related to process block 402, process block 404, and process block 406 as described in relation to FIG. 4A. Once the image has been manipulated by a user through manipulation commands at process block 406, process 410 continues at process block 412.

At process block 412, a determination is made as to whether the image placeholder is associated with the video content. This determination can be made for every image that is posted as part of the user posting. Thus, for example, the user may desire to insert not only video images on the user's posting, but also the user may want to insert other images as part of the user posting. Therefore, in one embodiment, the image placeholder can be tested to verify that the image is indeed a placeholder for a video content. In one embodiment, this determination is made by taking a flag for another indication that has been set in association with an image. For example, the placeholder image can have metadata associated with the placeholder image that includes a flag indicative of placeholder association. Process 410 continues at process block 414. Once the image is determined to be a placeholder image, the placeholder image can then be replaced with video content. As previously mentioned, this can be achieved by, for example, replacing the code of markup language that references the placeholder image with the markup language code that references the video content.

Figure 5A:
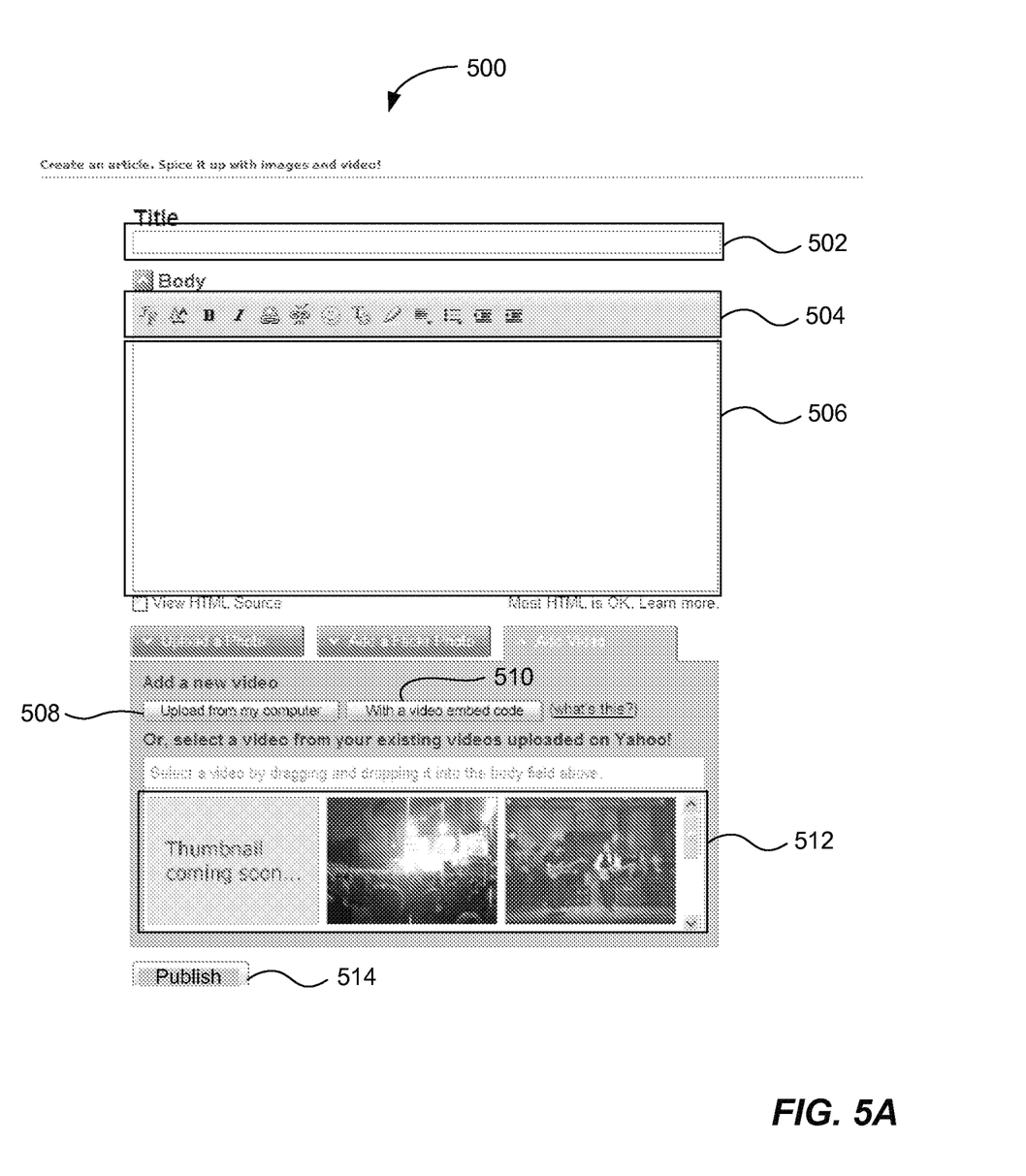
FIGS. 5A-5B depict a screenshot of a user interface for selecting video content according to one embodiment.

FIG. 5A depicts a screenshot of a user interface for selecting and uploading video content according to one embodiment. The user interface 500 can include one or more fields for user interaction in order to receive commands and input for editing the user's posting. For example, the user interface 500 can include a title field 502 that can be utilized by a user to enter the title of the posting. In addition, the user interface 500 can include and toolbar 504 that includes one or more user interface tools that allow a user to format the contents of the posting. In addition, the user interface 500 can also include an input field 506 wherein a user can type in text that is going to be part of the user's posting. In addition the field 506 can also receive HTML or other forms of markup language code. Furthermore, the input field 506 can also be used to drag and drop images that the user wants included in the posting. In addition to images, the user may also want to add video content to the posting. In this case, the user can for example, utilize a video thumbnail list 512 that includes one or more video thumbnails corresponding to video content. As previously mentioned, the user can select a video thumbnail from video thumbnail list 512 and drag and drop a selected video thumbnail onto the input field 506. In one embodiment, the video thumbnail list can be included in a pane, box, or any other use interface that can contain video thumbnails.

In a further embodiment, the user interface 500 can allow a user to upload a new video content from the user's computing device 102. The user may do this by, for example, selecting a button 508 that would permit a user to browse through the contents of a local storage associated with the user's computing device 102 or another associated device that stores video content that the user desires to post. In addition, the user may also reference video content from another network location such as a different website or media server that is connected to the data network 104. As such, the user may utilize a button 510 to select the option of embedding code that references a network address where the video is located. Once the user has inserted all the content such as text, images and video, onto the input field 506, the user may select a publish button 514 in order to publish the posting that the user has edited.

Figure 5B:
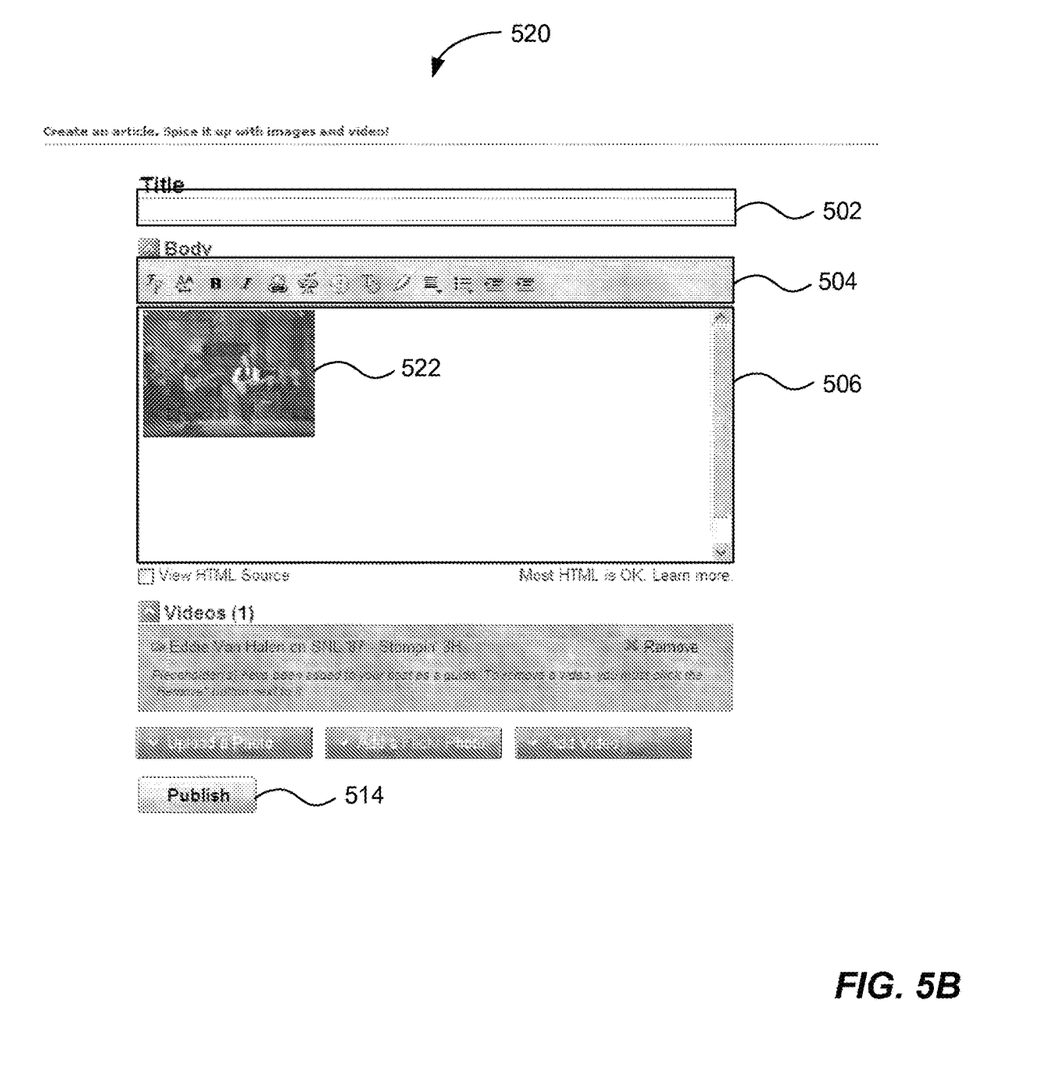

FIG. 5B depicts a screenshot of a user interface for selecting video. Once the user has selected the video content that the user would like to embed in the user posting, a placeholder image 522 can be inserted in input field 506. In one embodiment, the placeholder image can be defaulted to be inserted wherever the cursor is in relation to the input field 506. In another embodiment, the user can configure user settings such that the placeholder image is always inserted on the center of the input field 506.

Figure 6:
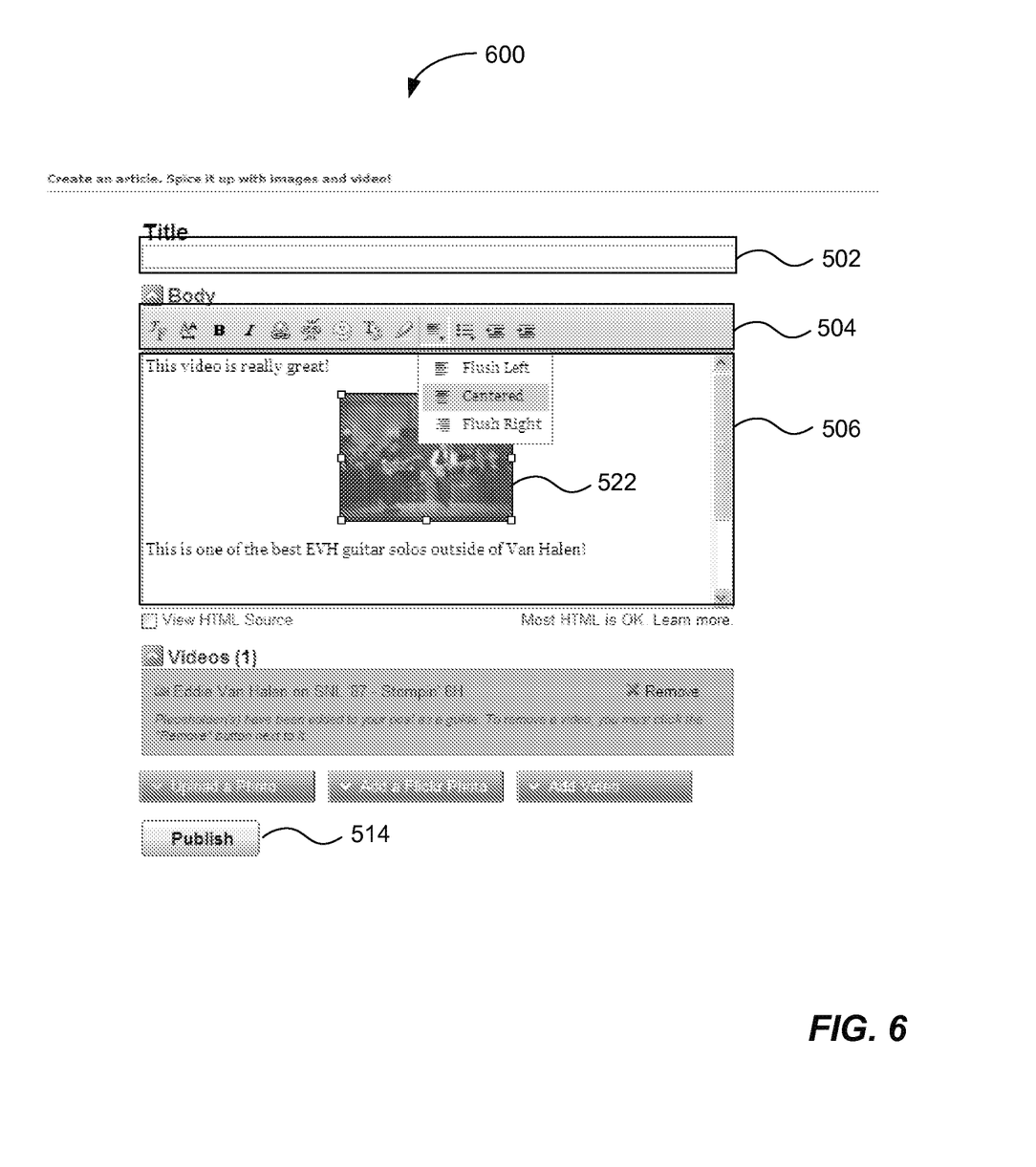
FIG. 6 depicts a screenshot of a user interface for manipulating a placeholder image according to one embodiment.

FIG. 6 depicts a screenshot of a user interface for manipulating a placeholder image according to one embodiment. Therefore, a user can, for example, position a placeholder image in a desired location of the input field 506, such that when displayed the video content is displayed in the location that the user selected for the placeholder image 522. In one example, the user may place the placeholder image at the center, at the left, or at right of the input field 506. In another example, the user may select to wrap text around the placeholder image. In yet another example, the user may select to enlarge horizontally the placeholder image. In another example, the user may select to enlarge vertically the placeholder image 522. As such, all of the user manipulations and editing applied to the placeholder image 522 can later be imported and applied to the video content displayed in the posting of the user. Thus, for example, if the users select the placeholder image to be of size 64×48 and centered in the posting, the video content, when displayed, will be applied those same formatting characteristics and be displayed with a user's settings as applied to the placeholder image 522.

Figure 7:
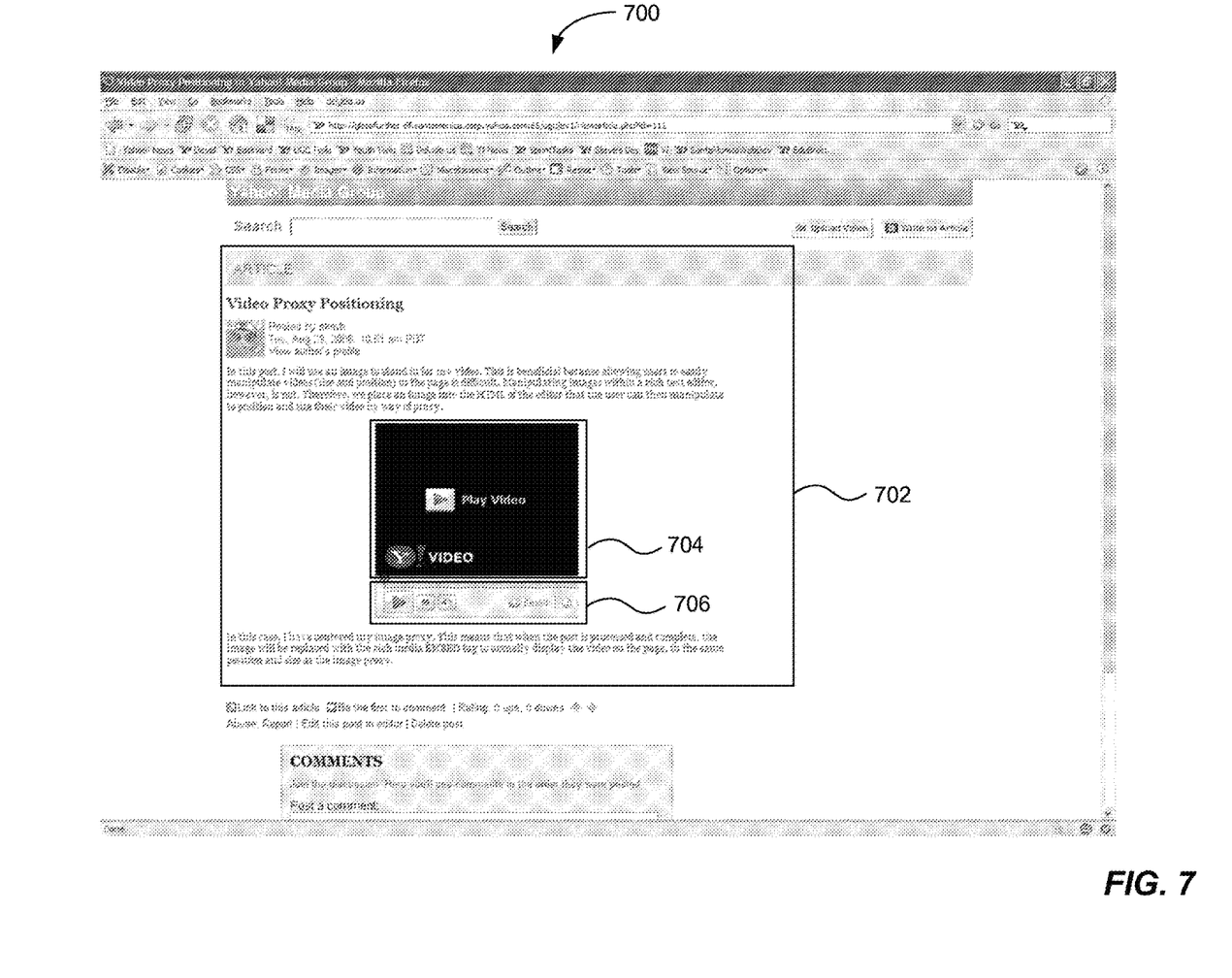
FIG. 7 depicts a screenshot of a user interface for displaying video content according to one embodiment.

FIG. 7 depicts a screenshot of a user interface for displaying video content according to one embodiment. Once the user is finished with editing the posting in input field 506, the user can select to publish the posting by selecting a button such as publish button 514. User interface 700 provides an exemplary published posting 702 that includes a text entered by the user in input field 506. User interface 700 further includes the video content inserted by the user also in input field 506. As previously mentioned, the logic in the replacing module 302 is utilized such that the video content is placed in lieu of the placeholder image 522. In one embodiment, the video content can include a display area 704 and a control toolbar 706. The display area 704 can be displayed exactly at the same location and with the same characteristics of size, picture, volume, etc. that used to format the placeholder image 522. Furthermore, the control toolbar 706 can be a standard media player toolbar that includes buttons such as play, pause, rewind, fast forward, stop, and so on. In addition, a viewing user can not only read the posting text, as well as view the video content, but also images provided in the posting 702 can also be displayed according to the images that were inserted by the posting user.

Many applications of the systems and methods described herein are contemplated. For example, this system can be utilized for security systems such as home or business security, surveillance systems, process monitoring, etc. Also, this system can be utilized as a collaboration tool, displaying several members of a group engaged in a common task, such as working on a business project or playing a turn-based game. In addition, this system can be utilized for information acquisition such as news monitoring, financial market events monitoring, match and sport updated scores reporting, etc. Furthermore, this system can be utilized for education and training, such as displaying webcast lectures and seminars. Moreover, this system can be utilized for entertainment such as displaying of TV and movie trailers, music videos, photo slideshows, TV shows, movies, live events, etc.

The video presented to a user as described herein, can be presented in the form of video thumbnails, a player window, or any other form of visual display that can render digital video.

The displayed video can be of multiple formats. For example, the displayed video can be any dynamic visual media, including animations, prerecorded video clips, live video streams, webcasts, podcasts, vlogs, etc.

Those skilled in the art will recognize that the methods and systems of the present disclosure may be implemented in many manners and as such are not to be limited by the foregoing exemplary embodiments and examples. In other words, functional elements being performed by a single or multiple components, in various combinations of hardware and software or firmware, and individual functions, can be distributed among software applications at either the client or server level or both. In this regard, any number of the features of the different embodiments described herein may be combined into single or multiple embodiments, and alternate embodiments having fewer than or more than all of the features herein described are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, and those variations and modifications that may be made to the hardware or software or firmware components described herein as would be understood by those skilled in the art now and hereafter.

The invention claimed is:

1. A method comprising:
   receiving a selection of video from a user;
   inserting a placeholder image into a posting field of a user interface, the placeholder image associated with the video and comprising a first markup tag including a placeholder image resource identifier and a placeholder identification;
   receiving a command from the user to manipulate the placeholder image;
   modifying properties of the placeholder image in response to the command by altering a layout and size of the placeholder image;
   receiving a command to publish the posting;
   replacing, prior to publishing the posting, the placeholder image with the video by removing the first markup tag and inserting a second markup tag, the second markup tag referencing a location of the video;
   retrieving the video from the location;
   modifying display characteristics of the video according to the altered layout and size of the placeholder image;
   inserting the modified video into the posting field; and
   publishing the posting.

2. The method of claim 1, the receiving a selection of video from a user comprising dragging and dropping the placeholder image into the posting field.

3. The method of claim 2, the dragging and dropping the placeholder image into the posting field comprising one of dropping the placeholder image at a location of a cursor or dropping the placeholder image at a fixed location outside of the posting field.

4. The method of claim 1, the modifying comprising modifying a position of the placeholder image in the posting field.

5. The method of claim 1, further comprising displaying resize handles on the placeholder image, the resize handles enabling the modifying a size of the placeholder image.

6. The method of claim 1, the modifying comprising modifying an alignment of the placeholder image, the alignment comprising a left, center, or right alignment.

7. The method of claim 1, the modifying comprising enabling text wrapping around the placeholder image.

8. The method of claim 1, further comprising:
   displaying a set of videos in the user interface, the set of videos including the video and arranged as a set of video thumbnails; and
   the receiving a selection of video from a user comprising receiving detecting a selection of a thumbnail associated with the video file and detecting a dragging and dropping the thumbnail associated with the video file into the posting field.

9. A non-transitory computer readable storage medium tangibly storing computer program instructions capable of being executed by a computer processor, the computer program instructions defining the steps of:
   receiving a selection of video from a user;
   inserting a placeholder image into a posting field of a user interface, the placeholder image associated with the video and comprising a first markup tag including a placeholder image resource identifier and a placeholder identification;
   receiving a command from the user to manipulate the placeholder image;
   modifying properties of the placeholder image in response to the command by altering a layout and size of the placeholder image;
   receiving a command to publish the posting;
   replacing, prior to publishing the posting, the placeholder image with the video by removing the first markup tag and inserting a second markup tag, the second markup tag referencing a location of the video;
   retrieving the video from the location;
   modifying display characteristics of the video according to the altered layout and size of the placeholder image;
   inserting the modified video into the posting field; and
   publishing the posting.

10. The computer readable storage medium of claim 9, the receiving a selection of video from a user comprising dragging and dropping the placeholder image into the posting field.

11. The computer readable storage medium of claim 10, the dragging and dropping the placeholder image into the posting field comprising one of dropping the placeholder image at a location of a cursor or dropping the placeholder image at a fixed location outside of the posting field.

12. The computer readable storage medium of claim 9, the modifying comprising modifying a position of the placeholder image in the posting field.

13. The computer readable storage medium of claim 9, further comprising computer program instructions defining the steps of displaying resize handles on the placeholder image, the resize handles enabling the modifying a size of the placeholder image.

14. The computer readable storage medium of claim 9, the modifying comprising modifying an alignment of the placeholder image, the alignment comprising a left, center, or right alignment.

15. The computer readable storage medium of claim 9, the modifying comprising enabling text wrapping around the placeholder image.

16. The computer readable storage medium of claim 9, further comprising computer program instructions defining the steps of:
   displaying a set of videos in the user interface, the set of videos including the video and arranged as a set of video thumbnails; and
   the receiving a selection of video from a user comprising receiving detecting a selection of a thumbnail associated with the video file and detecting a dragging and dropping the thumbnail associated with the video file into the posting field.

* * * * *